G. L. OWENS.
LATHE CHUCK.
APPLICATION FILED MAR. 12, 1910.

978,055.

Patented Dec. 6, 1910.

2 SHEETS—SHEET 1.

Witnesses
Benj. Finckel
Mayme Foard

Inventor
George L. Owens
by Finckel & Finckel
his Attorneys

UNITED STATES PATENT OFFICE.

GEORGE L. OWENS, OF COLUMBUS, OHIO, ASSIGNOR TO GEORGE M. FINCKEL, OF COLUMBUS, OHIO.

LATHE-CHUCK.

978,055.  Specification of Letters Patent.  Patented Dec. 6, 1910.

Application filed March 12, 1910. Serial No. 548,758.

*To all whom it may concern:*

Be it known that I, GEORGE L. OWENS, a citizen of the United States, residing at Columbus, in the county of Franklin and State of Ohio, have invented a certain new and useful Improvement in Lathe-Chucks, of which the following is a specification.

The so-called step chuck for lathes in common use by jewelers includes a split chuck head of hollow conical form with its inner surface provided with step-like seats of gradually diminishing diameter from the outer end inward. In this form of chuck decided inconvenience results from the fact that a small article to be treated must be seated and clamped at a point deeply within the chuck and far removed from the outer rim thereof where it is difficult to reach it with a tool. A further inconvenience results from the fact that several of such chucks appear to be required in order that articles of every diameter may be properly seated and held for treatment.

The object of the present invention is to provide a chuck of simple and easily manipulated construction in which any article whatever its diameter within the limits of the device can be held flush or substantially flush with the end of the chuck and in the most convenient position for treatment with a tool.

The invention is embodied in the example of it illustrated in the accompanying drawings and set forth in the following description, the features of novelty being pointed out in the appended claims.

Figure 1:
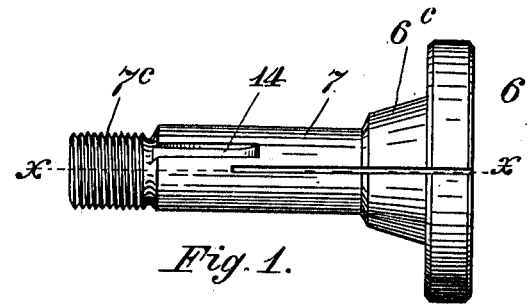
Figure 2:
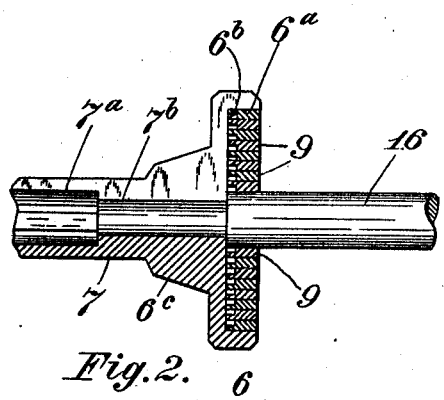
Figure 3:
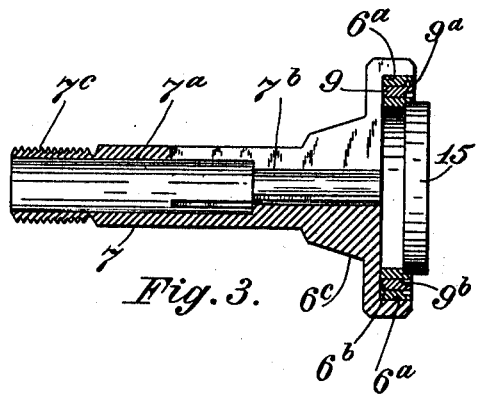
Figure 4:
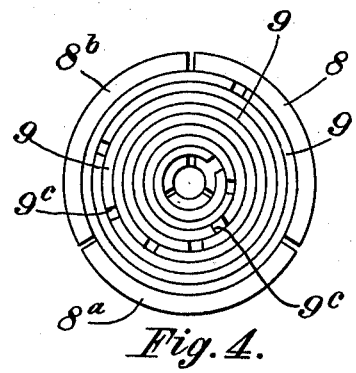
Figure 5:
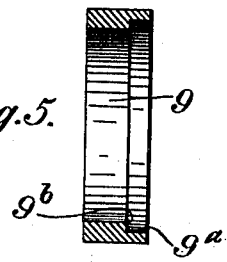
Figure 6:
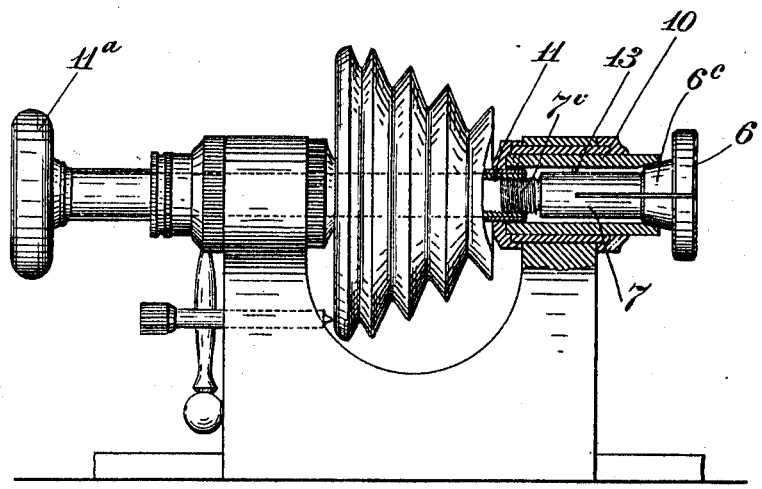

In said drawings—Figure 1 is a side elevation of a chuck according to the invention. Fig. 2 is a section on the line $x$—$x$ Fig. 1, a portion of the stem of the chuck being broken off and showing the clamping rings with their step edges turned inward and a rod or bar held in position for treatment. Fig. 3 is a similar section (except that the stem is not shown broken off as in Fig. 2) showing the clamping rings with their step edges turned outward and with an article of larger diameter held in the step or rabbet of the inner ring. Fig. 4 is an elevation of the outer or chucking end of the chuck. Fig. 5 is a diametrical section of one of the clamping rings on a larger scale. Fig. 6 is a general elevational view of the head stock of a lathe showing ordinary means for compressing the jaw head of the chuck.

The chuck of my invention includes a flaring head portion 6 with a central frustoconical boss $6^a$ and stem 7 all preferably of one piece of steel or other suitable spring metal. The head portion is axially bored out to provide a large circular recess having seats $6^a$ and $6^b$ for the clamping rings to be presently described and the shank and head are axially bored clear through as seen at $7^a$ and $7^b$. The head and shank are sawed or slit longitudinally with respect to the shank at three places equidistant apart so as to form jaws 8, $8^a$, and $8^b$, that are compressible toward the axis of the chuck, said jaws being adapted to spring to their original, or open position when the compressing force is relieved. The inner end of the shank 7 is threaded as indicated at $7^c$.

The device for gripping or holding the article to be treated consists of a series of rings 9 of normally different diameters but of equal and like rectangular form (generally) in the cross section of the bar constituting them. These rings are of gradually diminishing diameter from the outer one inward but preferably so as to fit or nest together and be held together in their nested condition by friction for convenience in handling. These rings 9, of which six are shown, are preferably made of spring steel or brass so as to be resilient and each is an integral body of a form greater than a half circle and preferably nearly a complete ring—that is to say has a small portion entirely omitted or cut out of it at one side as indicated at $9^c$ so as to render it temporarily contractile. Such a ring I understand to be denominated in the arts as an "open ring," and by that term I mean such a ring. The series of rings as a whole is made of such size as normally to fit within the seat $6^a$ of the chuck head when that seat is in its uncontracted condition and on the seat $6^b$ so that the exposed face of the series of rings shall be flush or about flush with the face rim of the head. The chucking device constructed as thus shown and described is capable of receiving and holding bars, wire, barrels, gear wheels or other objects of diameters varying from that of the internal diameter of the smallest ring (when compressed) upward to that of the large bore or seat $6^a$ of the jaws of the chuck itself. To adapt the rings for the reception and centering or proper positioning of a barrel, wheel or other flat object each ring has one of its inner corners cut out or rabbeted to form a centering or adjusting seat $9^a$ and an annular clamping surface $9^b$. This feature of the rings subserves the function of the ordinary well known step-chuck except that in the present invention the article to be operated on can be held flush or nearly flush with the face rim of the chuck head whether such article be of small or large diameter.

In practice the article to be treated as shown at 15 or 16 is placed in the proper one of the clamping rings (the rings of smaller diameter, if any, being pushed out) and the jaws compressed as the jaws of chucks usually are. A means for compressing the chuck jaws is illustrated in Fig. 6. In this view the compressing end of the lathe spindle is indicated at 10. The character 11 designates the usual internally threaded screw to engage the threaded end of the shank of the chuck. This screw has the usual hand wheel $11^a$ for turning it and the screw is held from movement longitudinally as usual when engaged with the threaded inner end of the chuck to move the same for compression of the jaws. The lathe spindle is provided with a pin 13 to enter the groove 14 of the chuck shank and prevent the chuck from turning when the screw 11 draws the chuck inward. When the chuck is thus drawn inward the compressing end of the spindle acts on the conical portion $6^c$ and compresses the jaws 8, $8^a$ and $8^b$ of the chuck. The pressure of the jaws is transmitted to the ring containing the article to be treated through all the intermediate rings.

The slits dividing the chuck head and spindle into jaws are preferably of a sufficient width to permit a compression of the jaws to an extent equal to or more than the thickness of the bar of the clamping ring, if the rings be of equal thickness of bar, in which case the chuck is adapted to receive and hold an object of any diameter varying from that of the smallest of the nested rings when compressed up to that of approximately the diameter of the cavity of the chuck head proper. The openings $9^c$ of the rings in such case should, of course, be sufficient to permit a contraction thereof conformable to the compression of the jaws.

The invention can be utilized with advantage on either small lathes for small work like watch makers' work or on large lathes for ordinary machine shop operations.

The forms and proportions of the parts can be varied without departing from the gist of the invention.

What I claim is:

1. A chuck for a lathe comprising, in combination a compressible chuck head provided with a suitable seat, and a plurality of resilient rings of different diameters each open at one point only to render it contractile and said rings adapted to nest together and seat in said seat and be collectively compressed by said chuck head.

2. A work holder for a lathe chuck comprising a plurality of open resilient rings of normally different diameters externally adapted to concentrically nest together and remain in nested position by frictional contact one with another and be collectively compressed by the application of pressure to the outermost one of said rings.

3. A work holder for a lathe chuck comprising a plurality of open resilient rings of normally different diameters externally adapted to concentrically nest together and be collectively compressed by the application of pressure to, the outermost one of said rings each of said rings having one of its inner corners rabbeted.

4. In combination with a chuck for a lathe having a compressible head provided with an internal annular seat, a work holder including a resilient ring open at one portion only to fit in the aforesaid seat, said ring having an interior work-gripping surface and one of its inner corners circumferentially rabbeted to form a supplemental work-gripping seat.

5. A chuck for lathes comprising, in combination, a compressible chuck head provided with a face seat and an annular rim seat around said face seat, and a plurality of rings constructed to nest together and fit on said face seat within the rim seat and be concentrically compressed by the latter seat.

6. A chuck for lathes comprising, in combination, a compressible chuck head provided with an annular rim seat and a face seat lying in a plane at right angles to the rim seat, and a plurality of rings constructed to nest together and fit on said face seat and within the rim seat and be concentrically compressed by the latter seat.

GEORGE L. OWENS.

Witnesses:
BENJAMIN FINCKEL,
EBIN T. ALBERT.